United States Patent
Park et al.

(10) Patent No.: US 12,064,742 B2
(45) Date of Patent: Aug. 20, 2024

(54) APPARATUS AND METHOD FOR PRODUCING POSITIVE ELECTRODE ACTIVE MATERIAL PRECURSOR

(71) Applicant: LG Chem, Ltd., Seoul (KR)

(72) Inventors: Kyoung Wan Park, Daejeon (KR); Seong Bae Kim, Daejeon (KR); Young Su Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 687 days.

(21) Appl. No.: 17/271,331

(22) PCT Filed: Nov. 1, 2019

(86) PCT No.: PCT/KR2019/014754
§ 371 (c)(1),
(2) Date: Feb. 25, 2021

(87) PCT Pub. No.: WO2020/096289
PCT Pub. Date: May 14, 2020

(65) Prior Publication Data
US 2021/0178354 A1 Jun. 17, 2021

(30) Foreign Application Priority Data
Nov. 5, 2018 (KR) .................. 10-2018-0134627

(51) Int. Cl.
*B01J 19/06* (2006.01)
*B01J 19/00* (2006.01)
(Continued)

(52) U.S. Cl.
CPC ............. *B01J 19/06* (2013.01); *B01J 19/006* (2013.01); *B01J 19/0066* (2013.01); *B01J 19/18* (2013.01);
(Continued)

(58) Field of Classification Search
CPC ...... B01J 19/06; B01J 19/006; B01J 19/0066; B01J 19/18; B01J 2219/00765;
(Continued)

(56) References Cited

U.S. PATENT DOCUMENTS

2007/0111098 A1   5/2007   Yang Kook et al.
2016/0354750 A1*  12/2016  Beni ................. B01F 25/438
(Continued)

FOREIGN PATENT DOCUMENTS

CN    1 228 621 A  *  9/1999  ............. C01G 53/00
CN    206027681 U     3/2017
(Continued)

OTHER PUBLICATIONS

Extended European Search Report for Application No. 19882098.7 mailed Jun. 8, 2021. 7 pgs.
(Continued)

*Primary Examiner* — Wayne A Langel
(74) *Attorney, Agent, or Firm* — Lerner David LLP

(57) ABSTRACT

Provided is an apparatus for producing a positive electrode active material precursor. The apparatus includes: a reactor into which a reaction solution is introduced; a stirrer being inserted into the reactor and stirring the reaction solution; and a filter type baffle being inserted into the reactor and including a filter.

12 Claims, 6 Drawing Sheets

(51) Int. Cl.
  *B01J 19/18* (2006.01)
  *C01G 53/00* (2006.01)
  *H01M 4/04* (2006.01)
  *H01M 4/02* (2006.01)

(52) U.S. Cl.
  CPC .......... *C01G 53/40* (2013.01); *H01M 4/0497* (2013.01); *B01J 2219/00765* (2013.01); *C01P 2004/03* (2013.01); *C01P 2006/40* (2013.01); *H01M 2004/028* (2013.01)

(58) Field of Classification Search
  CPC ................ C01G 53/40; H01M 4/0497; H01M 2004/028; C01P 2004/03; C01P 2006/40
  See application file for complete search history.

(56) References Cited

U.S. PATENT DOCUMENTS

| | | |
|---|---|---|
| 2017/0309894 A1 | 10/2017 | Hu et al. |
| 2022/0212121 A1 | 7/2022 | Liu et al. |

FOREIGN PATENT DOCUMENTS

| | | | | | |
|---|---|---|---|---|---|
| CN | 106669576 | A | | 5/2017 | |
| CN | 106797016 | A | | 5/2017 | |
| CN | 107916592 | A | | 4/2018 | |
| CN | 108479103 | A | | 9/2018 | |
| CN | 109 453 730 | A | * | 3/2019 | ............ B01D 36/04 |
| DE | 202017105147 | U1 | | 9/2017 | |
| JP | 2003 068 299 | A | * | 3/2003 | ............ Y02E 60/10 |
| JP | 2016153347 | A | | 8/2016 | |
| JP | 2017189769 | A | | 10/2017 | |
| KR | 100515029 | B1 | | 9/2005 | |
| KR | 100548988 | B1 | | 2/2006 | |
| KR | 100575065 | B1 | | 4/2006 | |
| KR | 20070001511 | A | | 1/2007 | |
| KR | 100887186 | B1 | | 3/2009 | |
| KR | 20100059601 | A | | 6/2010 | |
| KR | 20120049227 | A | | 5/2012 | |
| KR | 20150093320 | A | | 8/2015 | |
| KR | 101599569 | B1 | | 3/2016 | |

OTHER PUBLICATIONS

International Search Report for PCT/KR2019/014754 mailed Feb. 12, 2020; 2 pages.

Search Report dated Jan. 17, 2022 from Office Action for Application No. 201980055332.0 issued Jan. 21, 2022. 3 pgs.

\* cited by examiner

[FIG. 1]
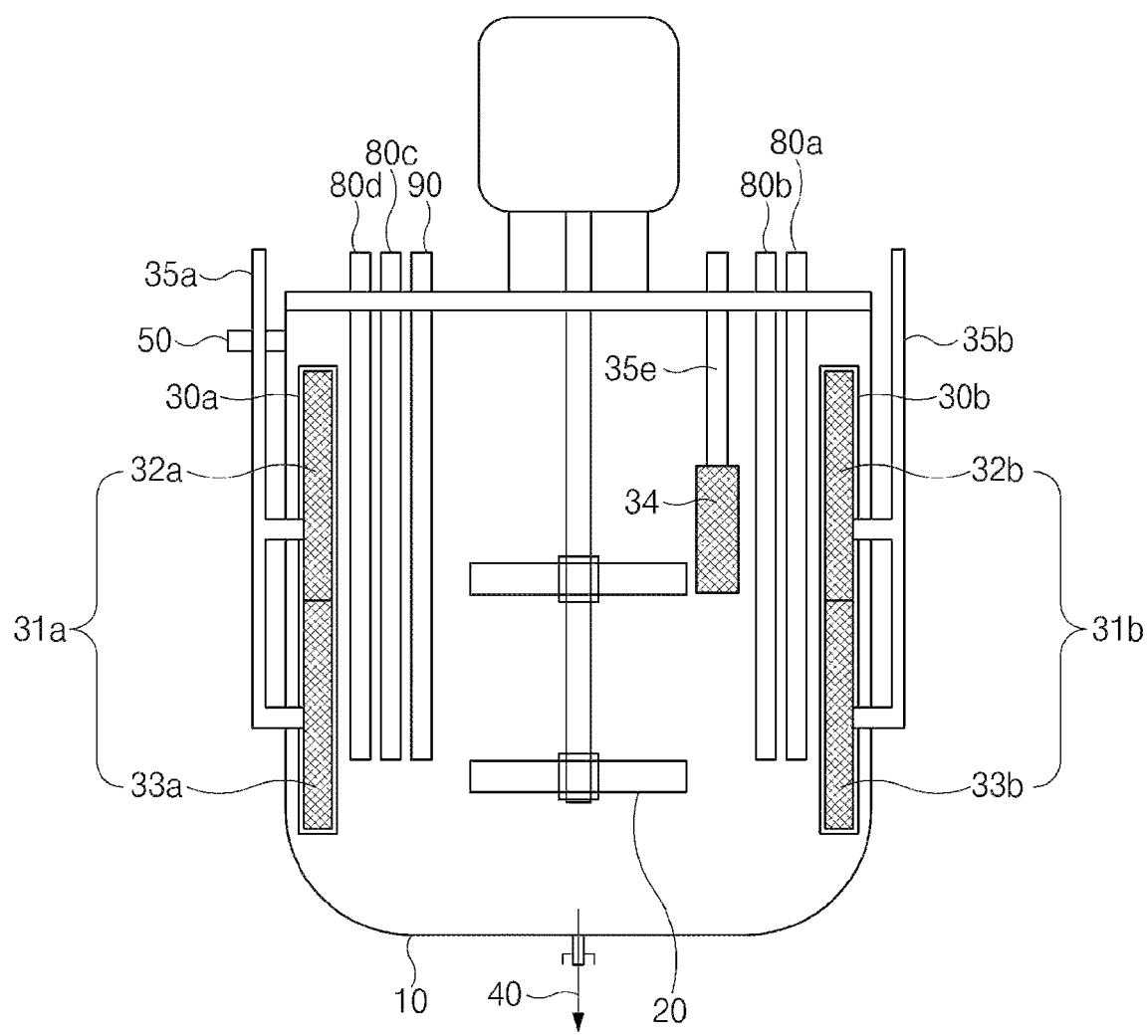

[FIG. 2]
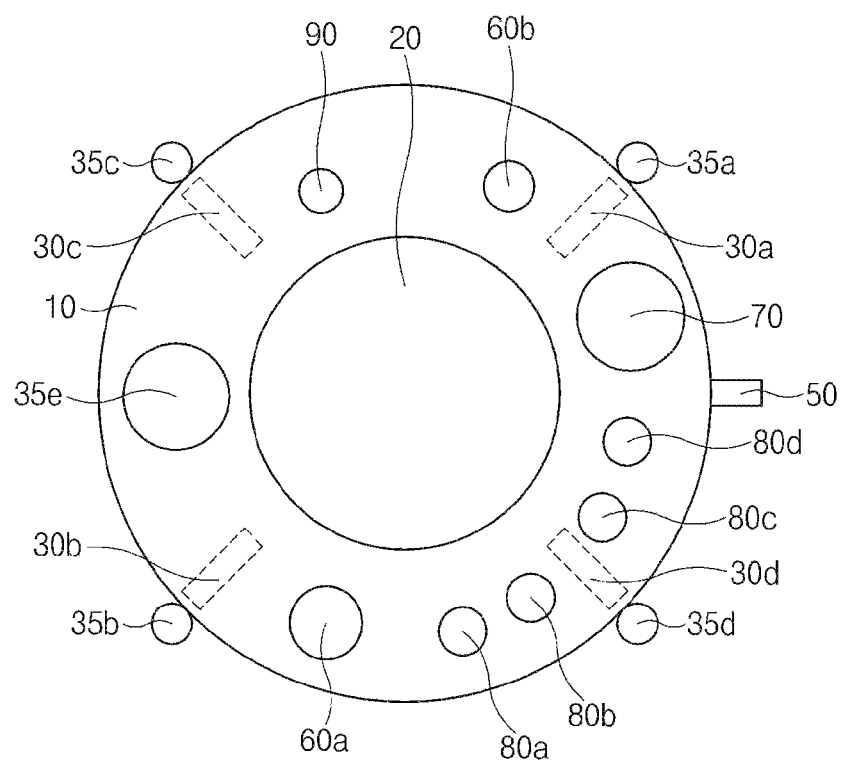

[FIG. 3]
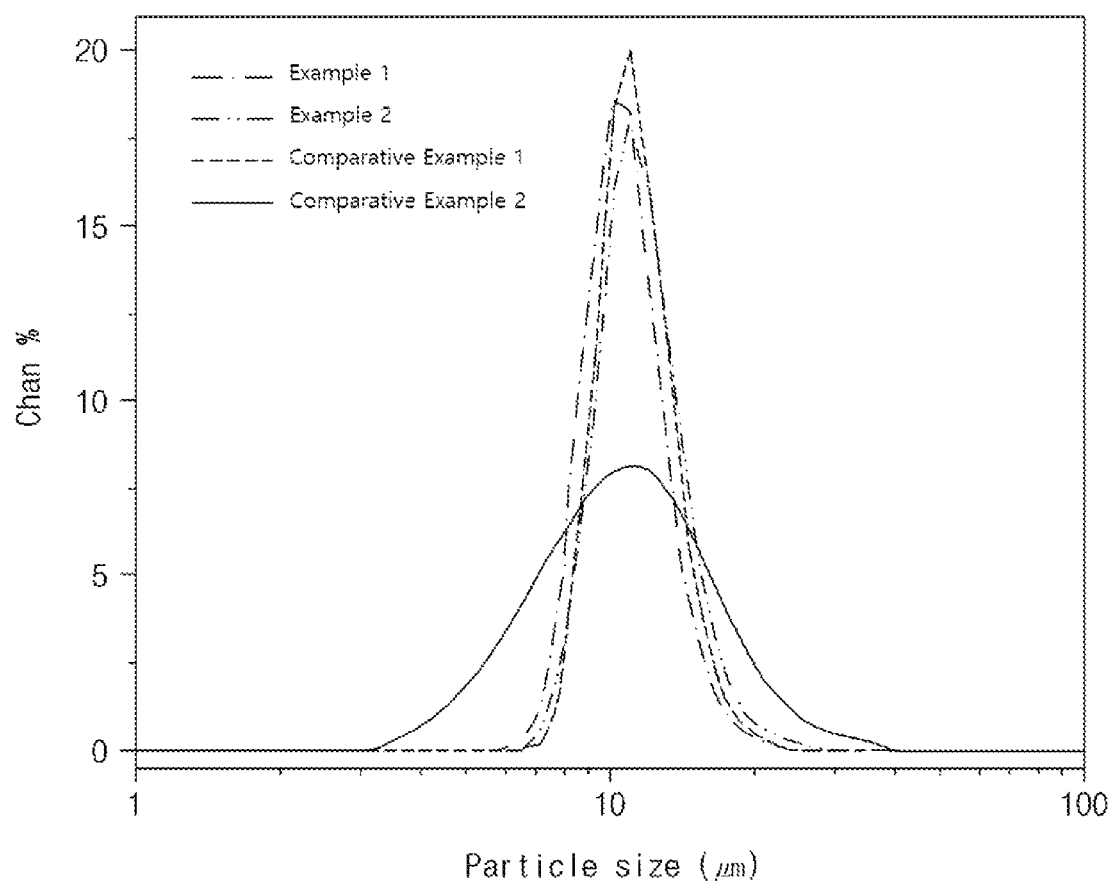

[FIG. 4]
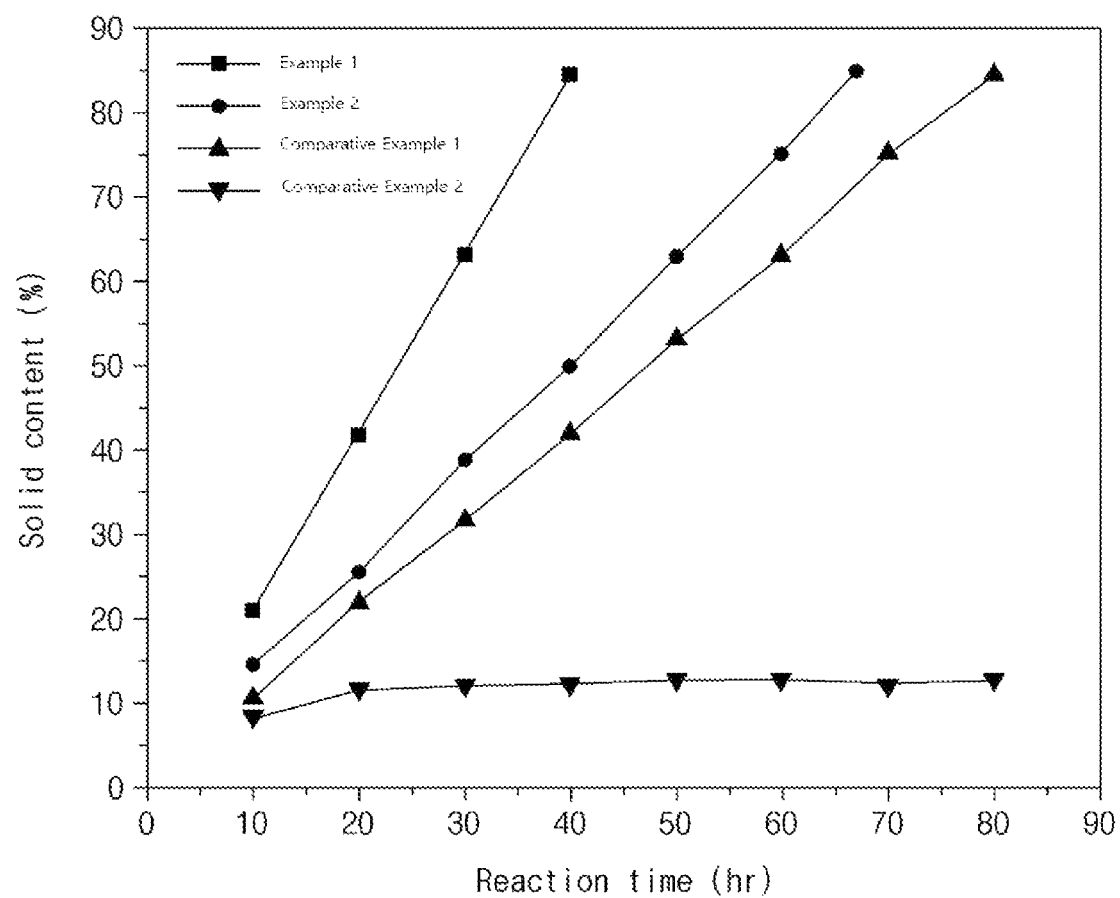

[FIG. 5]
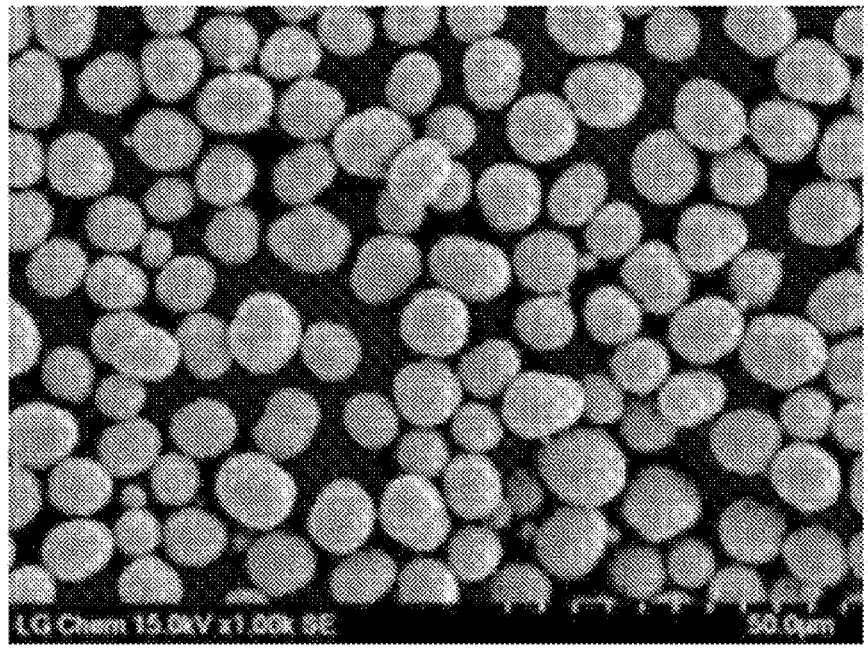
[FIG. 6]
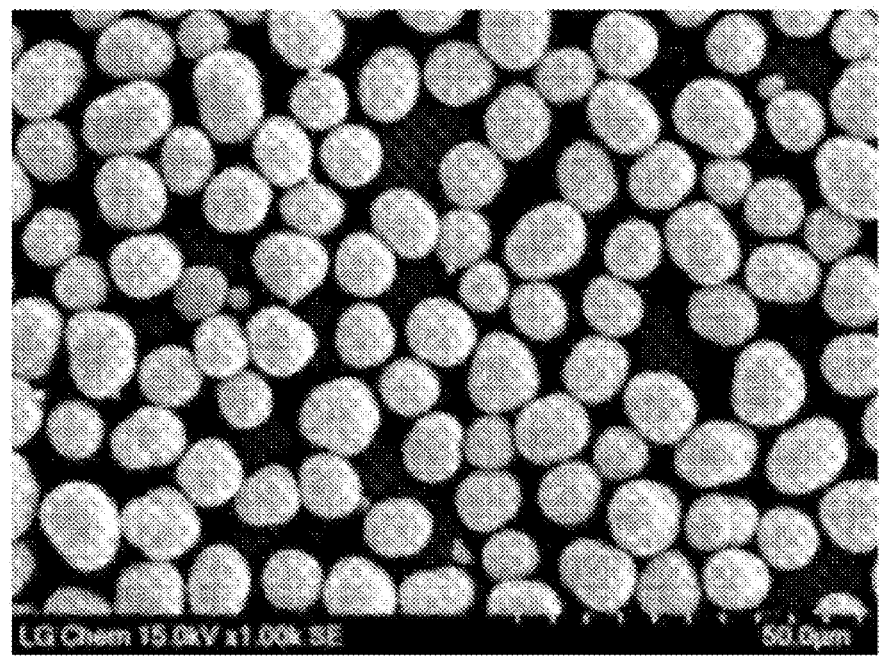

【FIG. 7】
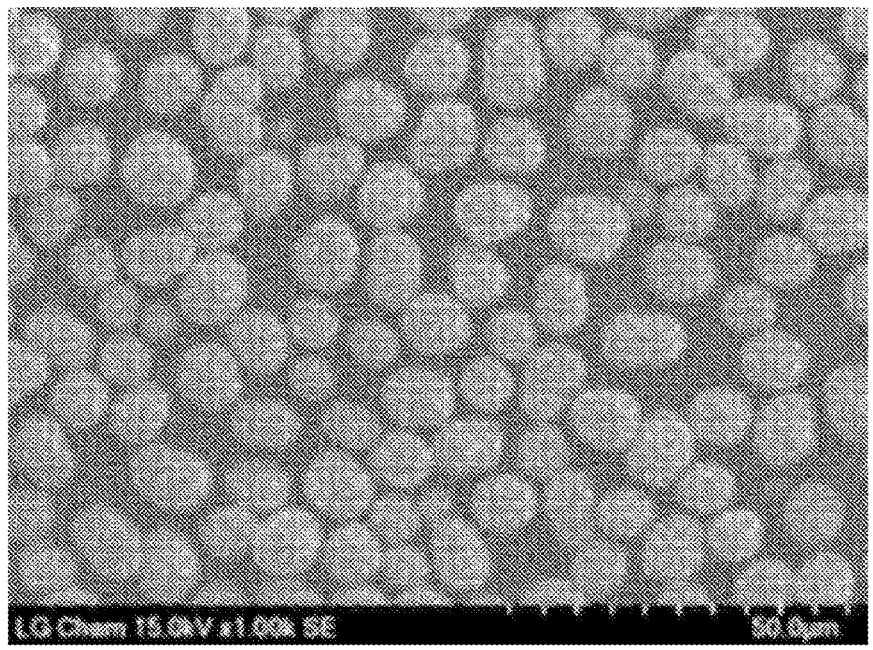
【FIG. 8】
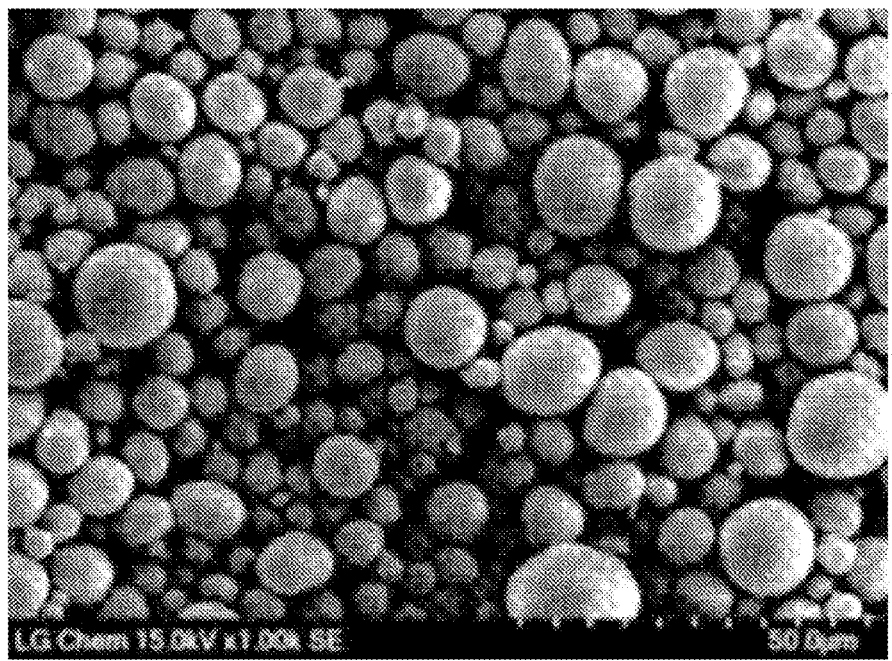

APPARATUS AND METHOD FOR PRODUCING POSITIVE ELECTRODE ACTIVE MATERIAL PRECURSOR

CROSS-REFERENCE TO RELATED APPLICATION

This application is based on and claims the benefit of priority to Korean Patent Application No. 10-2018-0134627, filed on Nov. 5, 2018 in the Korean Intellectual Property Office, the disclosure of which is incorporated herein in its entirety by reference.

TECHNICAL FIELD

The present invention relates to an apparatus and a method for producing a positive electrode active material precursor.

BACKGROUND ART

As technology development and a demand for a mobile device are increased, a demand for a secondary battery as an energy source is rapidly increased. Among the secondary batteries, a lithium secondary battery having high energy density and voltage, a long cycle life, and a low self-discharge rate is commercialized and widely used.

As a positive electrode active material of the lithium secondary battery, a lithium transition metal oxide is used, and among these, a lithium cobalt oxide of $LiCoO_2$ having a high operation voltage and excellent capacity characteristics has been mainly used. However, $LiCoO_2$ has very poor thermal characteristics due to destabilization of a crystal structure resulting from dilithiation, and due to its high costs, there is limitation in use of $LiCoO_2$ in a large quantity as a power source in the fields such as electric cars.

As a material to replace $LiCoO_2$, a lithium manganese oxide (such as $LiMnO_2$ or $LiMn_2O_4$), a lithium iron phosphate compound (such as $LiFePO_4$), a lithium nickel oxide (such as $LiNiO_2$), and the like have been developed. Among these, a lithium nickel oxide which has a high reversible capacity of about 200 mAh/g so that it is easy to implement a large capacity battery, is more actively studied and developed. However, in the case of $LiNiO_2$, it has a lower thermal stability than $LiCoO_2$, and when internal short circuit occurs by pressure from the outside and the like in a charged state, the positive electrode active material itself is decomposed to cause rupture and fire of a battery.

Accordingly, as a method for improving a low thermal stability while maintaining an excellent reversible capacity of $LiNiO_2$, $LiNi_{1-\alpha}Co_\alpha O_2$ ($\alpha$=0.1-0.3) in which nickel is partly replaced with cobalt, or a nickel cobalt manganese-based lithium composite metal oxide in which nickel is partly replaced with Mn and Co (hereinafter, simply referred to as "NCM-based lithium oxide") has been developed. In addition, in order to solve a safety problem resulting from elution of metal elements while having an excellent output characteristic, a lithium transition metal oxide having a concentration gradient of a metal composition has been suggested.

As a method for producing the positive electrode active material, a method for producing a positive electrode active material by producing a positive electrode active material precursor using a continuous reactor (continuous stirred-tank reactor, CSTR) and then baking the positive electrode active material precursor with a lithium raw material, and a method for producing a positive electrode active material by using a batch reactor to produce a positive electrode active material precursor and then baking the positive electrode active material precursor with a lithium raw material, may be representatively listed. The continuous reactor (CSTR) is operated in the manner of introducing and coprecipitating a raw material while discharging a precursor formed into particles, and the batch reactor is operated in the manner of introducing a raw material to be matched with a reactor volume for a period time, reacting the raw material, and discharging a reaction-completed precursor.

Generally, a positive electrode active material precursor produced using the continuous reactor (CSTR) may improve the productivity of the positive electrode active material precursor by introducing and coprecipitating a raw material simultaneously with discharging the precursor, but since raw material introduction and product discharge are performed simultaneously and continuously, there may be deviations in a residence time and a reaction time in the reactor, of the positive electrode active material precursors produced in the reactor, and accordingly, the size and the particle size of the positive electrode active material precursor produced are nonuniform.

In addition, the positive electrode active material precursor produced using the batch reactor has uniform particle size and granularity, but the productivity thereof is decreased as compared with the positive electrode active material precursor produced using the continuous reactor (CSTR).

Accordingly, development of an apparatus for producing a positive electrode active material precursor for improving both quality uniformity and productivity of the precursor is demanded.

Korean Patent Laid-Open Publication No. 10-2012-0049227 discloses a positive electrode active material for a lithium secondary battery, a production method thereof, and a lithium secondary battery.

RELATED ART DOCUMENT

[Patent Document]
Korean Patent Laid-Open Publication No. 10-2012-0049227

DISCLOSURE OF INVENTION

Technical Problem

An aspect of the present invention provides an apparatus for producing a positive electrode active material precursor, which includes a filter type baffle in which a filter and a baffle are integrated, to allow continuous filtration of a reaction solution and sufficiently secure a filtration flow rate to improve productivity.

Another aspect of the present invention provides an apparatus for producing a positive electrode active material precursor, which allows production of a positive electrode active material precursor having uniform particle size, particle shape, and particle size distribution.

Still another aspect of the present invention provides a method for producing a positive electrode active material precursor using the apparatus for producing a positive electrode active material precursor described above.

Technical Solution

According to an exemplary embodiment of the present invention, an apparatus for producing a positive electrode active material precursor includes: a reactor into which a reaction solution is introduced; a stirrer being inserted into the reactor and stirring the reaction solution; and a filter type baffle being inserted into the reactor and including a filter.

According to another an exemplary embodiment of the present invention, a method for producing a positive electrode active material precursor includes: forming a positive electrode active material precursor, while introducing a reaction solution including a transition metal-containing solution, an ammonium ion-containing solution, and a basic aqueous solution to the apparatus for producing a positive electrode active material precursor described above; and performing a continuous concentration process of introducing an additional reaction solution into the production apparatus, while operating the filter to continuously discharge a part of the reaction solution inside the production apparatus to an outside of the production apparatus.

Advantageous Effects

The apparatus for producing a positive electrode active material precursor of the present invention includes a filter type baffle in which a filter and a baffle are integrated to serve as both a filter and a baffle at the same time. The filter type baffle is mounted inside the production apparatus and performs both introduction and filtration of a reaction solution to allow production of a positive electrode active material precursor having uniform particle size, shape and distribution.

In addition, the apparatus for producing a positive electrode active material precursor of the present invention includes the filter type baffle to allow continuous filtration of the reaction solution. In addition, since the filter type baffle may serve as both a filter and a baffle at the same time, spatial constrains when a filter and a baffle are separately installed are solved, thereby sufficiently securing a filtration flow rate of the production apparatus, which is preferred for productivity improvement.

BRIEF DESCRIPTION OF DRAWINGS

FIG. 1 is a front view for schematically describing an apparatus for producing a positive electrode active material precursor according to an exemplary embodiment of the present invention.

FIG. 2 is a plan view for schematically describing an apparatus for producing a positive electrode active material precursor according to an exemplary embodiment of the present invention.

FIG. 3 is a graph representing a particle size distribution of positive electrode active material precursors produced by apparatuses for producing a positive electrode active material precursor according to Examples 1 and 2 and Comparative Examples 1 and 2.

FIG. 4 is a graph representing a solid content change with a reaction time of positive electrode active material precursors produced by apparatuses for producing a positive electrode active material precursor according to Examples 1 and 2 and Comparative Examples 1 and 2.

FIG. 5 is an SEM photograph of a positive electrode active material precursor produced by an apparatus for producing a positive electrode active material precursor according to Example 1.

FIG. 6 is an SEM photograph of a positive electrode active material precursor produced by an apparatus for producing a positive electrode active material precursor according to Example 2.

FIG. 7 is an SEM photograph of a positive electrode active material precursor produced by an apparatus for producing a positive electrode active material precursor according to Comparative Example 1.

FIG. 8 is an SEM photograph of a positive electrode active material precursor produced by an apparatus for producing a positive electrode active material precursor according to Comparative Example 2.

BEST MODE FOR CARRYING OUT THE INVENTION

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in best mode.

Terms used in the present specification are used only in order to describe exemplary embodiments rather than limiting the present invention. Singular forms are intended to include plural forms unless otherwise indicated contextually. It will be further understood that the terms "comprises", "provide", or "have" used in this specification, specify the presence of stated features, steps, operations, components, parts, or a combination thereof, but do not preclude the presence or addition of one or more other features, numerals, steps, operations, components, parts, or a combination thereof.

In the present specification, an average particle diameter ($D_{50}$) may be defined as a particle diameter corresponding to a cumulative volume of 50% in a particle diameter distribution curve. The average particle diameter ($D_{50}$) may be measured using, for example, a laser diffraction method. By the laser diffraction method, a particle diameter from a submicron range to several millimeters may be measured, and results of high reproducibility and high resolution may be obtained.

Hereinafter, the present invention will be described in detail.

Apparatus for Producing a Positive Electrode Active Material Precursor

The present invention relates to an apparatus for producing a positive electrode active material precursor, and specifically an apparatus for producing a positive electrode active material precursor which may be used as a precursor of a positive electrode active material for a lithium secondary battery.

The apparatus for producing a positive electrode active material precursor of the present invention includes a filter type baffle in which a filter and a baffle are integrated to serve as both a filter and a baffle at the same time. The filter type baffle is mounted inside the production apparatus and may perform both introduction and filtration of a reaction solution at the same time to produce a positive electrode active material precursor. Accordingly, the positive electrode active material precursor having uniform particle size, shape, and distribution may be produced by a continuous concentration process.

In addition, the apparatus for a positive electrode active material precursor of the present invention includes the filter type baffle to allow continuous filtration of the reaction solution and continuous concentration of the positive electrode active material precursor. In addition, since the filter type baffle may serve as both a filter and a baffle at the same time, spatial constrains when a filter and a baffle are separately installed are solved, thereby sufficiently securing a filtration flow rate of the production apparatus, and thus, it is possible to produce a positive electrode active material precursor having both high production efficiency and improved quality.

Hereinafter, the apparatus for producing a positive electrode active material precursor of the present invention will be described in detail with reference to the drawing. When reference numerals are given to components of each of the accompanying drawings, the same components will be denoted by the same reference numerals even though they are shown in different drawings. Further, in describing exemplary embodiments of the present invention, well-known functions or constructions may not be described in detail since they may unnecessarily obscure the of understanding the present invention.

FIGS. 1 and 2 are a front view and a plan view which schematically describe an apparatus for producing a positive electrode active material precursor according to an exemplary embodiment of the present invention.

Referring to FIGS. 1 and 2, the apparatus for producing a positive electrode active material precursor of the present invention includes a reactor 10, a stirrer 20, and filter type baffles 30*a*, 30*b*, 30*c*, and 30*d*.

The apparatus for producing a positive electrode active material precursor is for producing a positive electrode active material precursor, and specifically, a reaction solution is introduced into the reactor 10 to produce the positive electrode active material precursor, in which the reaction solution is continuously introduced into the reactor 10, while a part of the reaction solution is discharged to the outside through the filter type baffle 30*a*, 30*b*, 30*c*, and 30*d*.

Accordingly, a solid content concentration of the positive electrode active material precursor is increased, nuclear growth of the positive electrode active material precursor may be easy, and thus, the quality and productivity of the positive electrode active material precursor may be increased.

The reactor 10 may be provided in a reaction place where the positive electrode active material precursor is synthesized. To the reactor 10, the reaction solution may be introduced.

The reaction solution may include a transition metal-containing solution, an ammonium ion-containing solution, and a basic aqueous solution. The apparatus for producing a positive electrode active material precursor may include a plurality of reaction solution introduction lines 80*a*, 80*b*, 80*c*, and 80*d*, and the transition metal-containing solution, the ammonium ion-containing solution, and the basic aqueous solution may be introduced through the plurality of reaction solution introduction lines 80*a*, 80*b*, 80*c*, and 80*d*, respectively.

The stirrer 20 is inserted into the reactor 10 and may stir the reaction solution.

The reactor 10 and the stirrer 20 are not particularly limited, and a reactor and a stirrer which are commonly used in the art may be used without limitation.

The filter type baffles 30*a*, 30*b*, 30*c*, and 30*d* are inserted into the reactor 10 and include filters 31*a*, 31*b*, 31*c*, and 31*d*. Since the filter type baffles 30*a*, 30*b*, 30*c*, and 30*d* include the filters 31*a*, 31*b*, 31*c*, and 31*d*, only the used reaction solution may be discharged to the outside of the reactor 10 while the positive electrode active material precursor produced from the production apparatus may not be discharged to the outside of the reactor 10.

The filter type baffles 30*a*, 30*b*, 30*c*, and 30*d* may serve as both the baffle and the filter in the reactor 10. Specifically, the filter type baffles 30*a*, 30*b*, 30*c*, and 30*d* serve as a baffle in the reactor 10, thereby converting a flow direction of the reaction solution, and accordingly, the reactivity of reaction components in the reaction solution may be improved, and uniformity of the produced precursor may be improved. In addition, since the filter type baffles 30*a*, 30*b*, 30*c*, and 30*d* allow filtration and discharge of the reaction solution by the filters 31*a*, 31*b*, 31*c*, and 31*d* included therein, the produced precursor may be continuously concentrated, and accordingly, the granularity, and shape, distribution uniformity of the positive electrode active material precursor may be improved.

In addition, since the apparatus for producing a positive electrode active material precursor according to the present invention uses the filter type baffles 30*a*, 30*b*, 30*c*, and 30*d* in which a filter and a baffle are integrated, spatial efficiency and improved productivity of the precursor may be promoted as compared with the case in which the filter and the baffle are separately installed. Specifically, in the apparatus for producing a positive electrode active material precursor, the stirrer, various reaction solution introduction lines, and the like may be inserted into the reactor, as shown in FIGS. 1 and 2, and these are inserted through an upper portion of the reactor. However, conventionally, due to the spatial constraints from the inserted components occupying the inside of the reactor, there was limitation in sufficiently inserting the filter and the baffle. However, since the apparatus for producing a positive electrode active material precursor according to the present invention includes the filter type baffles 30*a*, 30*b*, 30*c*, and 30*d* which may serve as both the filter and the baffle, the spatial constraints of the reactor may be solved and the productivity of the precursor may be improved to a more preferred level.

The positions of the filter type baffles 30*a*, 30*b*, 30*c*, and 30*d* are not particularly limited, and may be properly determined depending on a stirring flow of the reaction solution in the stirrer 20. For example, the filter type baffles 30*a* and 30*b* may be disposed or attached on an outer wall of the reactor 10, as shown in FIG. 1, and in this case, the spatial efficiency of the reactor 10 may be promoted, which is thus preferred.

The number of the filter type baffles 30*a*, 30*b*, 30*c*, and 30*d* is not particularly limited, and may be properly determined depending on the volume, area, and the like of the reactor 10. For example, the number of filter type baffles 30*a*, 30*b*, 30*c*, and 30*d* may be at least one, and preferably, may be plural in terms of further improving a stirring degree and the reactivity of the reaction components. Specifically, the number of filter type baffles 30*a*, 30*b*, 30*c*, and 30*d* may be four, as shown in FIG. 2, but is not limited thereto. For example, the number of filter type baffles 30*a* and 30*b* is plural, and the plurality of filter type baffles 30*a*, 30*b*, 30*c*, and 30*d* may be disposed at predetermined intervals along the outer wall.

The filters 31*a*, 31*b*, 31*c*, and 31*d* may be made of a metal, and specifically, may include at least one selected from the group consisting of stainless steel and carbon steel, and preferably stainless steel. When the filters 31*a*, 31*b*, 31*c*, and 31*d* are made of a metal, durability of the filter may be improved.

In addition, when the filters 31*a*, 31*b*, 31*c*, and 31*d* are made of a metal, a flow rate per unit area passing through the filter may be increased, so that the reaction solution inside the production apparatus may be continuously discharged to the outside within a short time. Thus, since the reaction solution may be discharged to the outside through the filters 31*a*, 31*b*, 31*c*, and 31*d*, while the reaction solution is introduced into the reactor 10 simultaneously, continuous filtration of the reaction solution is possible. However, when a filter made of a nonwoven fabric is used, a flow rate per unit area is not sufficient, so that continuous filtration of the reaction solution may not be sufficient, and the flow direction of a solution may not be sufficiently converted with the filter type baffle.

The filters 31*a*, 31*b*, 31*c*, and 31*d* may include pores, and the pores may be smaller than the size of the produced positive electrode active material precursor. Accordingly, the produced positive electrode active material precursor may not be filtered through the filter, while the reaction solution is filtered through the filter. A pore size may be adjusted to an appropriate level considering the size of the positive electrode active material precursor to be produced, and the pore size may be specifically 0.01 µm to 50 µm, more specifically 0.05 µm to 30 µm, and preferably 0.07 µm to 10 µm.

A length of the filter type baffles 30*a*, 30*b*, 30*c*, and 30*d* may be designed to an appropriate level, considering the flow rate of the reaction solution, the conversion of the flow direction, and the like. Specifically, the length of the filter type baffles 30*a*, 30*b*, 30*c*, and 30*d* may be 50% to 95%, preferably 60% to 85% of the height of the reactor 10, and accordingly, the above-described effect of the filter type baffle may be more preferably implemented.

The filter type baffles 30*a*, 30*b*, 30*c*, and 30*d* may include a plurality of filters which are independently of each other operated, and the filter may be independently operated depending on a level to which the reaction solution is filled in the reactor 10. Accordingly, the production apparatus of the present invention may operate a plurality of filters partially and independently even in the case in which the reactor is not fully filled with the solution and adjust the filtration area and the filtration flow rate of the filter to various levels, and thus, is preferred in terms of securing efficient productivity and uniform quality of the positive electrode active material precursor.

Specifically, the filter type baffles 30*a*, 30*b*, 30*c*, and 30*d* may include upper filters 32*a*, 32*b*, 32*c*, and 32*d*, and lower filters 33*a*, 33*b*, 33*c*, and 33*d*, which are independently of each other operated, as shown in FIG. 1. For example, when the reaction solution reaches a first position of the reactor 10, the lower filters 33*a*, 33*b*, 33*c*, and 33*d* may be operated to perform filtration, and when the reaction solution reaches a second position which is higher than the first position, the upper filters 32*a*, 32*b*, 32*c*, and 32*d* may be further operated to perform filtration. That is, when the reaction solution in the reactor 10 is filled up to the first position, only the lower filters 33*a*, 33*b*, 33*c*, and 33*d* may be operated to perform filtration, but when the reaction solution in the reactor 10 is at the second position, the upper filters 32*a*, 32*b*, 32*c*, and 32*d* may be also operated together with the lower filters 33*a*, 33*b*, 33*c*, and 33*d*, to filter the reaction solution and discharge the filtered reaction solution to the outside. Thus, since filtration may be continuously performed from an initial growth stage of the positive electrode active material precursor, improved reaction efficiency and increased productivity are possible.

The first position may be the same or higher than the position of the reaction solution in the reactor 10, when the lower filters 33*a*, 33*b*, 33*c*, and 33*d* are all submerged in the reaction solution in the reactor 10, and the second position may be the same or higher than the position of the reaction solution in the reactor 10, when the upper filters 32*a*, 32*b*, 32*c*, and 32*d* are all submerged in the reaction solution in the reactor 10.

FIG. 1 illustrates that the filter type baffles 30*a*, 30*b*, 30*c*, and 30*d* include the upper filters 32*a*, 32*b*, 32*c*, and 32*d*, and the lower filters 33*a*, 33*b*, 33*c*, and 33*d*, but the number of filters is not limited thereto, and considering the size of the reactor, the flow rate of the reaction solution, and the like overall, two or more, a plurality of filter may be included in the filter type baffle, and these may be independently of each other operated.

The apparatus for producing a positive electrode active material precursor may include reaction solution discharge lines 35*a*, 35*b*, 35*c*, and 35*d* for discharging the reaction solution. The reaction solution discharge lines 35*a*, 35*b*, 35*c*, and 35*d* may perform a function to discharge the reaction solution filtered in the filter type baffles 30*a*, 30*b*, 30*c*, and 30*d* to the outside. Specifically, as shown in FIGS. 1 and 2, the reaction solution discharge lines 35*a*, 35*b*, 35*c*, and 35*d* may be connected to the filter type baffles 30*a*, 30*b*, 30*c*, and 30*d* and disposed outside of the reactor 10. For example, the reaction solution discharge lines 35*a*, 35*b*, 35*c*, and 35*d* may include a vacuum pump, and the filtered reaction solution may be discharged to the outside through the vacuum pump.

The apparatus for producing a positive electrode active material precursor may further include an additional filter 34. Specifically, the additional filter 34 may be inserted into the reactor 10. The additional filter 34 may perform continuous filtration of the reaction solution together with the filter type baffles 30*a*, 30*b*, 30*c*, and 30*d* described above, and accordingly, improvement of the additional filtration flow rate and improved productivity of the precursor therefrom may be promoted. In addition, when the additional filter 34 is included in the production apparatus, the spatial efficiency of the inside of the reactor 10 may be secured as much as possible, which is thus preferred, and an additional filtration flow rate is secured, so that the productivity and quality uniformity of the precursor may be further improved.

The number, area, size, and the like of the additional filter 34 are not particularly limited as long as they do not affect installation of the stirrer 20, the filter type baffles 30*a*, 30*b*, 30*c*, and 30*d*, and the like in the reactor 10, and they may be properly determined considering the space occupied by necessary components in the reactor 10.

The apparatus for producing a positive electrode active material precursor may further include an additional reaction solution discharge line 35*e* connected to the additional filter 34. As shown in FIG. 1, the additional reaction solution discharge line 35*e* is connected to the additional filter 34, and may perform a function to discharge the filtered reaction solution to the outside.

The apparatus for producing a positive electrode active material precursor may further include a precursor outlet 40, and the precursor outlet 40 may discharge the produced positive electrode active material precursor to the outside. For example, during production of the positive electrode active material precursor, the precursor outlet 40 is closed, but when the production of the positive electrode active material precursor having an increased solid content concentration is completed by performing the continuous filtration, the precursor outlet 40 may be opened to obtain the positive electrode active material precursor from the outside.

The apparatus for producing a positive electrode active material precursor may further include an overflow line 50. The overflow line 50 may be installed on an upper end of the reactor, and when an amount of the reaction solution in the reactor is excessive or the reactor is fully filled with the solution, the overflow line 50 may function to discharge the reaction solution to the outside to adjust the amount of the reaction solution inside the reactor.

The apparatus for producing a positive electrode active material precursor may further include sensors 60a and 60b on the upper portion of the reactor 10. The sensors 60a and 60b may perform a function to sensor a solution volume, solution pH, and the like inside the reactor.

The apparatus for producing a positive electrode active material precursor may further include a viewing window 70 on the upper portion of the reactor 10. The reaction process may be observed through the viewing window 70.

The apparatus for producing a positive electrode active material precursor may further include a nitrogen introduction line 90 inserted into the reactor 10. The nitrogen introduction line 90 is a passage for introducing nitrogen, and nitrogen may be purged into the reactor 10 through the nitrogen introduction line 90 to remove oxygen dissolved in the solution and create a non-oxygen atmosphere inside of the reactor 10.

Method for Producing Positive Electrode Active Material Precursor

In addition, the present invention provides a method for producing a positive electrode active material precursor using the apparatus for producing a positive electrode active material precursor described above.

Specifically, the method for producing a positive electrode active material precursor according to the present invention includes: forming a positive electrode active material precursor, while introducing a reaction solution including a transition metal-containing solution, an ammonium ion-containing solution, and a basic aqueous solution to the apparatus for producing a positive electrode active material precursor described above; and performing a continuous concentration process of introducing an additional reaction solution, while operating the filter to continuously discharge a part of the reaction solution inside the production apparatus to an outside of the production apparatus.

In the method for producing a positive electrode active material precursor according to the present invention, the reaction solution is introduced into the production apparatus to produce the positive electrode active material precursor, and a continuous concentration process of introducing an additional reaction solution into the production apparatus while discharging the reaction solution to the outside through the filter type baffle, is performed. Accordingly, the solid content concentration of the produced positive electrode active material precursor may be increased at a constant rate, thereby improving the quality and productivity of the positive electrode active material precursor to an excellent level.

In addition, as described above, since the method for producing a positive electrode active material precursor of the present invention uses a production apparatus including the filter type baffle, a space inside the reactor may be secured and the productivity of the positive electrode active material precursor may be improved therefrom, due to the use of the filter type baffle in which a filter and a baffle are integrated.

Hereinafter, the method for producing a positive electrode active material precursor according to the present invention will be described in detail.

First, a positive electrode active material precursor is formed while a reaction solution including a transition metal-containing solution, an ammonium ion-containing solution, and a basic aqueous solution is introduced to the apparatus for producing a positive electrode active material precursor described above.

The transition metal-containing solution, the ammonium ion-containing solution, and the basic aqueous solution may be introduced to the reaction solution introduction line described above, separately or together as a mixture thereof.

Among the transition metal-containing solution, the ammonium ion-containing solution, and the basic aqueous solution, first, the ammonium ion-containing solution and the basic aqueous solution may be introduced to a specific volume of the reactor to adjust a pH of the reactor.

The transition metal-containing solution is not particularly limited as long as it may be dissolved in water, and may include at least one selected from the group consisting of, for example, salts of transition metals, for example, acetates, nitrate, sulfate, halides, sulfides, hydroxide, oxides, and oxyhydroxides of transition metals.

The transition metal-containing solution may include salts of nickel (Ni), cobalt (Co), and manganese (Mn).

The nickel (Ni) may be included in the transition metal-containing solution as $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salts, nickel halides, or the like, and at least one of them may be used.

In addition, the cobalt (Co) may be included in the transition metal-containing solution as $Co(OH)_2$, CoOOH, $Co(OCOCH_3)_2 \cdot 4H_2O$, $Co(NO_3)_2 \cdot 6H_2O$, $CoSO_4 \cdot 7H_2O$, or the like, and at least one of them may be used.

In addition, the manganese (Mn) may be included in the transition metal-containing solution as manganese oxides such as $Mn_2O_3$, $MnO_2$, and $Mn_3O_4$; manganese salts such as $MnCO_3$, $Mn(NO_3)_2$, $MnSO_4$, manganese acetate, manganese dicarboxylate, manganese citrate, and fatty acid manganese salts; oxyhydroxides, manganese chloride, and the like, and at least one of them may be used.

In addition, the transition metal-containing solution may further include at least one metal salt selected from the group consisting of Al, Zr, B, W, Mo, Cr, Ta, Nb, Mg, Ce, Hf, Ta, La, Ti, Sr, Ba, Ce, F, P, S, and Y. For example, the transition metal-containing solution may include acetates, nitrates, sulfates, halides, sulfides, hydroxides, oxides, or oxyhydroxides of at least one selected from the group consisting of Al, Zr, B, W, Mo, Cr, Ta, Nb, Mg, Ce, Hf, Ta, La, Ti, Sr, Ba, Ce, F, P, S, and Y.

The ammonium ion-containing solution may include at least one selected from the group consisting of $NH_4OH$, $(NH_4)_2SO_4$, $NH_4NO_3$, $NH_4Cl$, $CH_3COONH_4$, and $(NH_4)_2CO_3$. Here, water or a mixture of water and an organic solvent uniformly miscible with water (specifically alcohol or the like) may be used as a solvent.

The basic aqueous solution may include at least one selected from the group consisting of NaOH, KOH, and $Ca(OH)_2$, and water or a mixture of water and an organic solvent uniformly miscible with water (specifically alcohol or the like) may be used as a solvent.

The positive electrode active material precursor may be formed by including: performing a coprecipitation reaction under a pH in the reactor of 11 to 13 to produce particle nuclei, and changing the pH in the reactor into pH 10 to 12 after production of the nuclei, to perform the coprecipitation reaction to grow particles.

That is, the ammonium ion-containing solution and the basic aqueous solution are introduced at the beginning of the reaction to make the pH condition in the reactor in a range of pH 11 to 13, and then the transition metal-containing solution is introduced into the reactor to produce particle nuclei. Here, as the particle nuclei is produced by introducing the transition metal-containing solution, the pH value in the reactor changes, and thus, the transition metal-containing solution, the ammonium ion-containing solution, and the basic aqueous solution may be introduced together to control the pH to be maintained at pH 11 to 13. When the pH range is satisfied, production of the particle nuclei preferentially occurs, and particle growth may hardly occur.

When the particle nuclei production is finished, the pH in the reactor is made in a range of 10 to 12, and the produced particle nuclei are grown while the transition metal-containing solution is introduced. Here, as described above, as the particle nuclei are grown by introducing the transition metal-containing solution, the pH value changes, and thus, the transition metal-containing solution, the ammonium ion-containing solution, and the basic aqueous solution may be introduced together to control pH to be maintained at pH 10 to 12. When the pH range is satisfied, new particle nuclei are hardly produced, and growth of particles may preferentially occur.

For example, the transition metal-containing solution may be injected so that an injection speed of the transition metal is 0.15 mol/L·hr to 0.5 mol/L·hr. When the transition metal is injected in the above range, an increased output of the positive electrode active material precursor and a uniform particle size distribution may be simultaneously secured.

In addition, the transition metal-containing solution introduced to the reactor is injected so that the injection speed of the transition metal is at a specific range (0.15 mol/L·hr to 0.5 mol/L·hr) throughout the nucleus production process and the particle growth process, whereby particle growth slowly occurs at a specific rate, and thus, a solid content concentration in the reactor depending on the particle growth is also increased at a specific rate.

The positive electrode active material precursor produced by the above process may be in the form of a transition metal hydroxide, and for example, may be a compound represented by the following Chemical Formula 1:

$$Ni_aCO_bMn_cM^1_d(OH)_2 \qquad \text{[Chemical Formula 1]}$$

wherein a+b+c+d=1, 0.5≤a<1, 0<b≤0.5, 0≤c≤0.5, and 0≤d≤0.1; and $M^1$ is at least one selected from the group consisting of Al, Zr, B, W, Mo, Cr, Ta, Nb, Mg, Ce, Hf, Ta, La, Ti, Sr, Ba, Ce, F, P, S, and Y.

In the transition metal hydroxide of Chemical Formula 1, Ni may be included at a content corresponding to a, for example, 0.5≤a<1, specifically 0.6≤a<1. When the content of the Ni in the transition metal hydroxide of Chemical Formula 1 has a composition of 0.5 or more, a sufficient amount of Ni for contributing to charge/discharge in the positive electrode active material produced by including Ni is secured, thereby promoting a higher capacity of a battery.

In the transition metal hydroxide of Chemical Formula 1, Co may be included at a content corresponding to b, that is, 0<b≤0.5. When the content of Co in the transition metal hydroxide of Chemical Formula 1 is more than 0.5, costs may be increased. Considering remarkable improvement of charge/discharge efficiency by inclusion of Co, Co may be included more specifically at a content of 0.05≤b≤0.3.

In the transition metal hydroxide of Chemical Formula 1, Mn may secure a life characteristic and structural stability. Considering the effects, Mn may be included at a content corresponding to c, that is, 0≤c≤0.5. When c in the transition metal hydroxide of Chemical Formula 1 is more than 0.5, an output characteristic charge/discharge efficiency of a battery may be deteriorated, and Mn may be included more specifically at a content of 0.05≤c≤0.3.

In the transition metal hydroxide of Chemical Formula 1, $M^1$ may be at least one selected from the group consisting of Al, Zr, B, W, Mo, Cr, Ta, Nb, Mg, Ce, Hf, Ta, La, Ti, Sr, Ba, Ce, F, P, S, and Y, and $M^1$ may be included at a content corresponding to d, 0≤d≤0.1.

Meanwhile, a first transition metal-containing solution including nickel cation and a second transition metal-containing solution having a different concentration of the transition metal cation from the first transition metal-containing solution may be used as the transition metal-containing solution to produce a precursor having a concentration gradient of the transition metal composition in particles.

For example, the first transition metal-containing solution and the second transition metal-containing solution having a different transition metal cation concentration from the first transition metal-containing solution may be mixed through a mixer and introduced to the reactor.

The first and second transition metal-containing solutions may include for example, at least one cation selected from the group consisting of nickel, manganese, and cobalt (metal salt of a transition metal).

The first and the second transition metal-containing solutions may have different concentrations of transition metal cations from each other, and for example, the first transition metal-containing solution may have a higher nickel cation concentration than the second transition metal-containing solution. For example, the first transition metal-containing solution may have a mole ratio of the nickel (Ni) salt to the entire transition metal salts of 80% or more, and the second transition metal-containing solution may have a mole ratio of the nickel (Ni) salt to the entire transition metal salt of 60% or less.

In addition, the first transition metal-containing solution may have a lower cation concentration of at least one transition metal of manganese (Mn) and cobalt (Co) as compared with the second transition metal-containing solution. For example, the first transition metal-containing solution may have a mole ratio of the manganese (Mn) and/or cobalt (Co) salts to the entire transition metal salts of 20% or less, and the second transition metal-containing solution may have a mole ratio of the manganese (Mn) and/or cobalt (Co) salts to the entire transition metal salts of 30% or more.

As such, introduction rates of the first transition metal-containing solution and the second transition metal-containing solution having different cation concentrations may be adjusted to form a precursor having a concentration gradient of a transition metal composition in particles.

For example, the introduction rate of the first transition metal-containing solution may be gradually decreased and the introduction rate of the second transition metal-containing solution may be gradually increased to form a concentration gradient.

Next, a continuous concentration process of introducing an additional reaction solution while operating the filter to continuously discharge a part of the reaction solution inside the production apparatus to the outside of the production apparatus, is performed.

Specifically, the additional reaction solution including the transition metal-containing solution, the ammonium ion-containing solution, and the basic aqueous solution is introduced to the inside of the production apparatus, while the reaction-completed reaction solution is continuously discharged to the outside of the production apparatus using the filter type baffle included in the production apparatus, simultaneously, whereby particle nuclei of the positive electrode active material precursor may be further gown and the positive electrode active material precursor may be continuously concentrated. The transition metal-containing solution, the ammonium ion-containing solution, and the basic aqueous solution included in the additional reaction solution are as described above for the reaction solution.

As the particles of the positive electrode active material precursor grow, the solid content concentration in the reactor may be increased at a constant rate. In addition, as the solid content concentration of the positive electrode active material precursor is increased, a growth rate of the positive electrode active material precursor particles is decreased, so that the positive electrode active material precursor particles having a narrow particle size distribution and a dense structure may be produced. In addition, when the reaction solution is introduced into the reactor, while the reaction-completed reaction solution is discharged to the outside of the reactor simultaneously, more particle growth may occur for the same reaction time, thereby significantly increasing the productivity of the precursor particles.

The discharge flow rate of the reaction solution and the introduction flow rate of the additional reaction solution may be the same. For example, when the introduction flow rate of the additional reaction solution is higher than the discharge flow rate of the reaction solution, a continuous reaction may be impossible due to an increased level of the reactor, and when the introduction flow rate of the additional reaction solution is lower than the discharge flow rate of the reaction solution, a continuous reaction may be impossible due to a decreased level of the reactor.

The discharge of the reaction solution is to discharge only the reaction solution to the outside of the reactor using the filter type baffle, and by the filter type baffle, the positive electrode active material precursor is not discharged to the outside of the reactor, and only the reaction solution may be selectively continuously discharged to the outside of the production apparatus.

The solid content concentration of the positive electrode active material precursor may be constantly increased by the continuous concentration process, and may be increased at a rate of specifically 1.3% to 4.5% per hour, preferably 2% to 4% per hour. In addition, in the production of the positive electrode active material precursor, the reaction may be continuously performed for 2 days to 15 days after reaction is initiated, and it is preferred that the reaction is finished when the solid content concentration in the reactor is at 20% to 140%, preferably at 80% to 120%.

As such, in the case in which the reaction is finished when the solid content concentration in the reactor is at 20% to 140% while the solid content concentration in the reactor is increased at a specific rate, the productivity of precursor particles is increased and the positive electrode active material having a narrow particle size distribution and a dense structure may be produced simultaneously. Specifically, when the positive electrode active material precursor is produced according to the present invention, the precursor output may be significantly increased, as compared with that when the positive electrode active material precursor is produced by a conventional method without discharge and further introduction of the reaction solution using a batch reactor having the same size.

The positive electrode active material precursor produced by the production method may be mixed with a lithium-containing raw material and baked to produce the positive electrode active material.

The lithium-containing raw material is not particularly limited as long as it is a compound contains a lithium source, but preferably, at least one selected from the group consisting of lithium carbonate ($Li_2CO_3$), lithium hydroxide (LiOH), $LiNO_3$, $CH_3COOLi$, and $Li_2(COO)_2$ may be used.

The positive electrode active material precursor and the lithium-containing raw material may be mixed at a mole ratio of 1:1 to 1:1.15. When the lithium-containing raw material is mixed at a mole ratio less than the range, the capacity of the produced positive electrode active material may be decreased, and when the lithium-containing raw material is mixed at a mole ratio more than the range, particles may be sintered during the baking process, so that it may be difficult to produce the positive electrode active material, and a capacity decrease and separation of the positive electrode active material particles after baking (causing a joining phenomenon of the positive electrode active material) may occur.

The baking may be performed at a temperature of 700° C. to 1000° C. When the baking temperature is lower than 700° C., the raw material may remain in the particles due to an insufficient reaction to deteriorate the high temperature stability of a battery, and a volume density and crystallinity may be decreased to deteriorate the structural stability. Meanwhile, when the baking temperature is higher than 1000° C., nonuniform growth of particles may occur, and a particle amount included per unit area is decreased due to the too much increased particle size, thereby decreasing a volume capacity of a battery. Meanwhile, considering the particle size control, the capacity, and the stability of the produced positive electrode active material and the decreased lithium-containing by-product, the baking temperature may be preferably 700° C. to 950° C.

The baking may be performed for 5 to 35 hours. When the baking time is less than 5 hours, the reaction time is too short, so that it may be difficult to obtain the positive electrode active material having high crystallinity, and when the baking time Is more than 35 hours, the particle size may be excessively increased and production efficiency may be decreased.

In addition, the present invention provides a positive electrode for a lithium secondary battery including the positive electrode active material produced by the above-described method. Specifically, a positive electrode for a secondary battery is provided, in which the positive electrode for a secondary battery includes a positive electrode current collector and a positive electrode active material layer formed on the positive electrode current collector, and the positive electrode active material layer includes the positive electrode active material according to the present invention.

The positive electrode may be produced by a common method for producing a positive electrode, except for using the positive electrode active material described above.

In addition, the present invention may produce an electrochemical device including the positive electrode. The electrochemical device may be, specifically a battery or a capacitor, and more specifically, a lithium secondary battery.

Specifically, the lithium secondary battery includes a positive electrode, a negative electrode disposed to face the positive electrode, and a separator and an electrolyte interposed between the positive electrode and the negative electrode, and the positive electrode may be the positive electrode for a lithium secondary battery described above.

In addition, the lithium secondary battery may selectively further include a battery container for storing an electrode assembly of the positive electrode, the negative electrode, and the separator, and a sealing member for sealing the battery container.

The lithium secondary battery may be used in portable devices such as a mobile phone, a notebook computer, and a digital camera, electric vehicle fields such as a hybrid electric vehicle (HEV), and the like.

Hereinafter, the Examples of the present invention will be described in detail so as to be easily practiced by a person with ordinary skill in the art to which the present invention pertains. However, the present invention may be implemented in various different forms and is not limited to the embodiments provided in the present description.

EXAMPLES

Example 1 Production of Positive Electrode Active Material Precursor

1. Manufacture of Apparatus for Producing Positive Electrode Active Material Precursor The apparatus for producing a positive electrode active material precursor shown in FIGS. 1 and 2 was manufactured.

Specifically, in a reactor having a volume of 70 L, four filter type baffles including a stainless steel filter having a pore size of 0.1 µm were installed on an outer wall of the reactor at constant intervals. The filter included in the filter type baffle was composed of an upper filter and a lower filter which may be independently operated. A length of the filter type baffle was 65% of the total height of the reactor, and the lower filter was disposed at 15 to 50% of the height of the reactor and the upper filter was disposed at 50 to 85% of the height of the reactor. In addition, an additional filter made of a metal (stainless steel) having a pore size of 5 µm was inserted into the reactor, and an additional reaction solution discharge line for discharging a reaction solution to the outside of the reactor was connected. Otherwise, a stirrer, a reaction solution discharge line, a precursor outlet, an overflow line, a sensor, a viewing window, a reaction solution introduction line, and a nitrogen introduction line were installed.

2. Production of Positive Electrode Active Material Precursor $NiSO_4$, $CoSO_4$, and $MnSO_4$ were mixed in water in amounts so that a mole ratio of nickel:cobalt:manganese was 8:1:1, to prepare a transition metal-containing solution having a concentration of 2.4 M.

The transition metal-containing solution, an aqueous NaOH solution having a concentration of 25 wt %, and an aqueous $NH_4OH$ solution having a concentration of 9 wt % were prepared and introduced to the reactor through the reaction solution introduction line.

After 20 L of deionized water was added to the reactor, nitrogen was purged at a rate of 10 L/min through a nitrogen introduction line of the reactor to remove oxygen dissolved in water and create a non-oxygen atmosphere inside the reactor. Thereafter, 40 mL of the aqueous NaOH solution having a concentration of 25 wt % and 870 mL of the aqueous $NH_4OH$ solution having a concentration of 9 wt % were introduced, and then the solution were stirred at a stirring speed of 550 rpm at 50° C. to maintain the pH in the reactor at 12.2.

Thereafter, the transition metal-containing solution, the aqueous NaOH solution, and the aqueous $NH_4OH$ solution were introduced at rates of 16 mol/hr, 32 mol/hr, and 4.8 mol/hr, respectively, and were reacted for 120 minutes, thereby forming a particle nucleus of a nickel cobalt manganese composite metal hydroxide at pH 12.2.

Subsequently, the transition metal-containing solution, the aqueous NaOH solution, and the aqueous $NH_4OH$ solution were introduced so that pH was 11.6, thereby deriving particle growth of the nickel cobalt manganese composite metal hydroxide. Thereafter, when the reaction solution reached the height of the lower filter (50% of the height of the reactor), the lower filter of the filter type baffle was operated for 3.5 hours to continuously discharge the solution inside the reactor through the reaction solution discharge line and grow the nickel cobalt manganese composite metal hydroxide particles, and the reactor (70 L) was fully filled with the solution. When the reactor was fully filled with the solution, the upper filter and the additional filter of the filter type baffle were further operated to continuously discharge the reaction-completed reaction solution to the outside of the reactor through the reaction solution discharge line, while continuously introducing the transition metal-containing solution, the aqueous NaOH solution, and the aqueous NHAOH solution, the reaction was maintained for 34.5 hours to grow the nickel cobalt manganese composite metal hydroxide particles, and the nickel cobalt manganese composite metal hydroxide particles formed therefrom were separated to the precursor outlet, washed with water, and dried in an oven at 120° C., thereby producing a $Ni_{0.8}Co_{0.1}Mn_{0.1}(OH)_2$ precursor.

Example 2 Production of Positive Electrode Active Material Precursor

1. Manufacture of Apparatus for Producing Positive Electrode Active Material Precursor An apparatus for producing positive electrode active material precursor of Example 2 was manufactured in the same manner as in Example 1, except that the additional filter and the additional reaction solution discharge line were not installed in the production apparatus of Example 1.

2. Production of Positive Electrode Active Material Precursor $NiSO_4$, $CoSO_4$, and $MnSO_4$ were mixed in water in amounts so that a mole ratio of nickel:cobalt:manganese was 8:1:1, to prepare a transition metal-containing solution having a concentration of 2.4 M.

The transition metal-containing solution, an aqueous NaOH solution having a concentration of 25 wt %, and an aqueous $NH_4OH$ solution having a concentration of 9 wt % were prepared and introduced to the reactor through the reaction solution introduction line.

After 20 L of deionized water was added to the reactor, nitrogen was purged at a rate of 10 L/min through a nitrogen introduction line of the reactor to remove oxygen dissolved in water and create a non-oxygen atmosphere inside the reactor. Thereafter, 40 mL of the aqueous NaOH solution having a concentration of 25 wt % and 870 mL of the aqueous $NH_4OH$ solution having a concentration of 9 wt % were introduced, and then the solution were stirred at a stirring speed of 550 rpm at 50° C. to maintain the pH in the reactor at 12.2.

Thereafter, the transition metal-containing solution, the aqueous NaOH solution, and the aqueous $NH_4OH$ solution were introduced at rates of 9.6 mol/hr, 19.1 mol/hr, and 2.9 mol/hr, respectively, and were reacted for 150 minutes, thereby forming a particle nucleus of a nickel cobalt manganese composite metal hydroxide at pH 12.2.

Subsequently, the transition metal-containing solution, the aqueous NaOH solution, and the aqueous $NH_4OH$ solution were introduced so that pH was 11.6, thereby deriving particle growth of the nickel cobalt manganese composite metal hydroxide. Thereafter, when the reaction solution reached the height of the lower filter (50% of the height of the reactor), the lower filter of the filter type baffle was operated for 6 hours to continuously discharge the solution inside the reactor through the reaction solution discharge line and grow the nickel cobalt manganese composite metal hydroxide particles, and the reactor (70 L) was fully filled with the solution. When the reactor was fully filled with the solution, the upper filter of the filter type baffle was further operated to continuously discharge the reaction-completed reaction solution to the outside of the reactor through the reaction solution discharge line, while continuously introducing the transition metal-containing solution, the aqueous NaOH solution, and the aqueous $NH_4OH$ solution, and the reaction was maintained for 57.6 hours, thereby growing the nickel cobalt manganese composite metal hydroxide particles. The nickel cobalt manganese composite metal hydroxide particles formed therefrom was separated, washed with water, and dried in an oven at 120° C. to produce a $Ni_{0.8}Co_{0.1}Mn_{0.1}(OH)_2$ precursor.

Comparative Example 1: Production of Positive Electrode Active Material Precursor 1. Manufacture of Apparatus for Producing Positive Electrode Active Material Precursor An apparatus for producing a positive electrode active material precursor of Comparative Example 1 was manufactured in the same manner as in Example 1, except that instead of the filter of Example 1, a baffle made of a stainless steel having at the same size as the filter type baffle of Example 1 was used at the position in the production apparatus of Example 1.

2. Production of Positive Electrode Active Material Precursor $NiSO_4$, $CoSO_4$, and $MnSO_4$ were mixed in water in amounts so that a mole ratio of nickel:cobalt:manganese was 8:1:1, to prepare a transition metal-containing solution having a concentration of 2.4 M.

The transition metal-containing solution, an aqueous NaOH solution having a concentration of 25 wt %, and an aqueous $NH_4OH$ solution having a concentration of 9 wt % were prepared and introduced to the reactor through the reaction solution introduction line.

After 20 L of deionized water was added to the reactor, nitrogen was purged at a rate of 10 L/min through a nitrogen introduction line of the reactor to remove oxygen dissolved in water and create a non-oxygen atmosphere inside the reactor. Thereafter, 40 mL of the aqueous NaOH solution having a concentration of 25 wt % and 870 mL of the aqueous $NH_4OH$ solution having a concentration of 9 wt % were introduced, and then the solution were stirred at a stirring speed of 550 rpm at 50° C. to maintain the pH in the reactor at 12.2.

Thereafter, the transition metal-containing solution, the aqueous NaOH solution, and the aqueous $NH_4OH$ solution were introduced at rates of 8 mol/hr, 16 mol/hr, and 2.4 mol/hr, respectively, and were reacted for 240 minutes, thereby forming a particle nucleus of a nickel cobalt manganese composite metal hydroxide at pH 12.2.

Subsequently, the transition metal-containing solution, the aqueous NaOH solution, and the aqueous $NH_4OH$ solution were introduced so that pH was 11.6, thereby deriving particle growth of the nickel cobalt manganese composite metal hydroxide. Thereafter, the nickel cobalt manganese composite metal hydroxide was grown for 5.5 hours, and then the reactor (70 L) was fully filled with the solution. When the reactor was fully filled with the solution, the additional filter was operated to continuously discharge the reaction-completed reaction solution to the outside of the reactor through the reaction solution discharge line, while continuously introducing the transition metal-containing solution, the aqueous NaOH solution, and the aqueous $NH_4OH$ solution, and the reaction was maintained for 70.5 hours, thereby growing the nickel cobalt manganese composite metal hydroxide particles, and the nickel cobalt manganese composite metal hydroxide particles formed therefrom were separated, washed with water, and dried in an oven at 120° C., thereby producing a $Ni_{0.8}Co_{0.1}Mn_{0.1}(OH)_2$ precursor.

Comparative Example 2: Production of Positive Electrode Active Material Precursor 1. Manufacture of Apparatus for Producing Positive Electrode Active Material Precursor An apparatus for producing a positive electrode active material precursor of Comparative Example 2 used a common continuous stirred tank reactor (CSTR).

2. Production of Positive Electrode Active Material Precursor $NiSO_4$, $CoSO_4$, and $MnSO_4$ were mixed in water in amounts so that a mole ratio of nickel:cobalt:manganese was 8:1:1, to prepare a transition metal-containing solution having a concentration of 2.4 M. The transition metal-containing solution, the aqueous NaOH solution, and the aqueous $NH_4OH$ solution were introduced to the continuous stirred tank reactor (CSTR) at rates of 8 mol/hr, 16 mol/hr, and 2.4 mol/hr, respectively. The temperature of the reactor was 50° C., and the solution was stirred at a speed of 400 rpm to precipitate the nickel cobalt manganese composite metal hydroxide. The nickel cobalt manganese composite metal hydroxide particles formed therefrom were separated, washed with water, and dried in an oven at 120° C. to produce a $Ni_{0.8}Co_{0.1}Mn_{0.1}(OH)_2$ precursor.

EXPERIMENTAL EXAMPLES

Experimental Example 1: Evaluation of Particle Size Distribution

In order to confirm the particle size distribution of the positive electrode active material precursor particles produced in Examples 1 and 2 and Comparative Examples 1 and 2, S-3500 from Microtrac was used to measure the granularities of the positive electrode active material precursor produced in Examples 1 and 2 and Comparative Examples 1 and 2, and the results are shown in the following Table 1 and FIG. 3.

TABLE 1

| | $D_5$ (μm) | $D_{50}$ (μm) | $D_{95}$ (μm) | $(D_{95} - D_5)/D_{50}$ |
|---|---|---|---|---|
| Example 1 | 7.8 | 10.2 | 14.6 | 0.68 |
| Example 2 | 8.1 | 10.9 | 15.8 | 0.70 |
| Comparative Example 1 | 8.2 | 10.7 | 15.0 | 0.63 |
| Comparative Example 2 | 5.0 | 10.2 | 20.1 | 1.48 |

Referring to Table 1 and FIG. 3, it is confirmed that the positive electrode active material precursors produced in the production apparatuses of the Examples had a narrower particle size distribution than that of Comparative Example 2 using a common CSTR, and had excellent quality uniformity.

In Comparative Example 1, the positive electrode active material precursor had a particle size distribution at a similar level to those of the Examples. However, it is confirmed that the particle size distribution of the precursor of Comparative Example 1 was achieved by performing filtration twice as much as Example 1 (about 76 hours). Accordingly, the production apparatuses of the Examples were significantly better than those of the Comparative Examples, in terms of improving both the quality uniformity and the productivity of the positive electrode active material.

Experimental Example 2: Evaluation of Solid Content Change in Reactor 50 mL of the solutions inside the reactor were extracted at 10 hour intervals from the production apparatuses of Examples 1 and 2 and Comparative Examples 1 and 2, filtered under reduced pressure, and dried at 120° C., and the recovered quantity of the precursor was divided by the extracted solution amount (50 mL), thereby measuring the solid content change in the reactor. The measurement results are shown in FIG. 4.

Referring to FIG. 4, when the positive electrode active material precursors were produced from the production apparatuses of the Examples, it is confirmed that the solid content was increased at a higher rate than that of the Comparative Examples. Accordingly, it is confirmed that the production apparatuses of the Examples significantly reduced the production time of the positive electrode precursor to improve the productivity of the precursor.

Experimental Example 3: Evaluation of Particle Characteristics

The positive electrode active material precursors produced in Examples 1 and 2 and Comparative Examples 1 and 2 were taken by a scanning electron microscope (SEM) to confirm the particle characteristics of the positive electrode active material precursors. The SEM photographs of the positive electrode active material precursor produced from the production apparatuses of the Examples 1 and 2 and Comparative Examples 1 and 2 are shown in order in FIGS. 5 to 8.

Referring to FIGS. 5 to 8, it is confirmed that the positive electrode active material precursors produced d by performing continuous filtration from the production apparatuses of the Examples had a uniform particle size distribution and excellent quality, as compared with the positive electrode active material precursor produced from the production apparatus of Comparative Example 2

In Comparative Example 1, the positive electrode active material precursor had a particle size distribution at a similar level to those of the Examples. However, it is confirmed that in Example 1, an excellent particle size distribution of the precursor may be implemented by the filtration for about 38 hours, while the particle size distribution of the precursor of Comparative Example 1 was achieved by performing filtration twice as much as Example 1 (about 76 hours), as compared with Example 1. Accordingly, the production apparatuses of the Examples were significantly better than those of the Comparative Examples, in terms of improving both the quality uniformity and the productivity of the positive electrode active material.

Experimental Example 4: Physical Property Change Depending on Solid Content Change in Reactor The physical property change depending on the solid content change was measured, for the nickel cobalt manganese composite metal hydroxide particles in the reactor, during the continuous concentration process as in Example 1 and Comparative Example 1. Specifically, 50 mL of the solution inside the reactor was extracted at 10 hour intervals, filtered reduced pressure, and dried at 120° C., and recovered under quantity of the precursor was divided by the extracted solution amount (50 mL) to perform calculation, thereby measuring the solid content change in the reactor. When the solid content was 40%, 60%, and 80%, respectively, the positive electrode active material precursor particles were extracted and the average particle diameter and the aspect ratio thereof were measured, and the results are shown in the following Table 2. As shown in Table 2, when the solid content in the reactor is increased at a constant rate, the aspect ratio of the positive electrode active material precursor particles is close to 1, and thus, it is confirmed that spherical uniform particles may be formed.

TABLE 2

|  |  | Solid content in reactor | | | |
|---|---|---|---|---|---|
|  |  | 20% | 40% | 60% | 80% |
| Example 1 | Average particle diameter ($D_{50}$) (μm) | 6.9 | 8.4 | 9.2 | 10.1 |
|  | Aspect ratio | 0.88 | 0.90 | 0.91 | 0.91 |
| Comparative Example 1 | Average particle diameter ($D_{50}$) (μm) | 7.2 | 8.8 | 10.0 | 10.7 |
|  | Aspect ratio | 0.85 | 0.91 | 0.92 | 0.93 |

Referring to Table 2, it is confirmed that the positive electrode active material precursor produced from the production apparatus of Example 1 had quality uniformity at a similar level to that of Comparative Example 1. However, it is confirmed that in Example 1, the aspect ratio was achieved by the filtration for about 38 hours, while the aspect ratio of the precursor of Comparative Example 1 was achieved by performing the filtration twice as much as Example 1 (about 76 hours). Accordingly, the production apparatus of Example 1 was significantly better than that of Comparative Example 1, in terms of improving both the quality uniformity and the productivity of the positive electrode active material.

REFERENCE SIGNS LIST

10: reactor
20: stirrer
30a, 30b, 30c, 30d: filter type baffle
31a, 31b, 31c, 31d: filter
32a, 32b, 32c, 32d: upper filter
33a, 33b, 33c, 33d: lower filter
34: additional filter
35a, 35b, 35c, 35d: reaction solution discharge line
35e: additional reaction solution discharge line
40: precursor outlet
50: overflow line
60a, 60b: sensor
70: viewing window
80a, 80b, 80c, 80d: solution introduction line
90: nitrogen introduction line

The invention claimed is:

1. An apparatus for producing a positive electrode active material precursor, comprising:
   a reactor to which a reaction solution is introduced;
   a stirrer in the reactor, wherein the stirrer is configured to stir the reaction solution; and
   a filter type baffle in the reactor, wherein the filter type baffle includes a filter,
   wherein the filter type baffle is disposed on an outer wall of the reactor.

2. The apparatus of claim 1, wherein the filter type baffle includes an upper filter and a lower filter which are configured to operate independently of each other.

3. The apparatus of claim 2, wherein
   the lower filter is configured to operate when the reaction solution reaches a first position of the reactor,
   the upper filter is configured to operate when the reaction solution reaches a second position of the reactor, and
   the second position is higher than the first position.

4. The apparatus of claim 1, wherein the filter type baffle includes a filter made of a metal.

5. The apparatus of claim 4, wherein the metal includes at least one selected from the group consisting of a stainless steel and a carbon steel.

6. The apparatus of claim 1, further comprising: an additional filter in the reactor.

7. The apparatus of claim 1, wherein
   the filter type baffle is present in plural to form a plurality of filter type baffles, and
   the plurality of filter type baffles are disposed along the outer wall of the reactor.

8. The apparatus of claim 1, wherein the filter type baffle include a plurality of filters which are configured to operate independently of each other.

9. The apparatus of claim 1, wherein the filter includes pores having a size of 0.01 µm to 50 µm.

10. A method for producing a positive electrode active material precursor, comprising:
    forming a positive electrode active material precursor while introducing a reaction solution including a transition metal-containing solution, an ammonium ion-containing solution, and a basic aqueous solution to the apparatus of claim 1, and
    performing a continuous concentration process including introducing an additional reaction solution into the apparatus while operating the filter to continuously discharge a part of the reaction solution inside the apparatus to an outside of the apparatus.

11. The method of claim 10, wherein the filter type baffle includes an upper filter and a lower filter which are operated independently of each other,
    when an amount of the reaction solution inside the apparatus reaches a first position of the reactor, the lower filter is operated,
    when an amount of the reaction solution inside the apparatus reaches a second position of the reactor, the lower filter and the upper filter are operated, and
    the second position is higher than the first position.

12. The method of claim 10, wherein a solid content concentration of the positive electrode active material precursor inside the apparatus is increased at a specific rate.

* * * * *